Patented July 23, 1935

2,009,033

UNITED STATES PATENT OFFICE 2,009,033

PROCESS OF PRESERVING FOOD STUFFS

Theodore L. Swenson, Chevy Chase, Md.

No Drawing. Application August 17, 1932, Serial No. 629,240

11 Claims. (Cl. 99—14)

The present invention relates to a process of preserving food stuffs, and particularly relates to a process for use in the handling of poultry.

In preserving food stuffs by cold storage processes, the primary object is to maintain the product in a condition closely approximating its condition when in a fresh state. In preserving poultry under cold storage conditions, if the carcass is to be preserved in a fresh state, the cold storage conditions must be such that no freezer burns will develop, no shrinkage will occur and there will be no loss of bloom. Freezer burns are due to the freezing of moisture in or under the skin of the carcass in localized areas. Ordinary cold storage conditions tend to dehydrate the tissues of the carcass in moist areas thereof and the collected moisture is frozen. Upon thawing, these dehydrated areas give the appearance of having been burned or seared. Ordinarily cold storage conditions also withdraw the moisture from the carcass, causing a loss of water and so affect the carcass that it becomes darkened and the skin has a dull and shrivelled appearance as well as a shrunken looseness of texture. Loss of bloom is attributed to slow oxidative changes, possibly to enzymatic oxidases. A principal object of the present invention is to provide a process by which fresh produce may be treated so that it will remain in its natural state.

In connection with the preservation of poultry, the particular object is to preserve the poultry in such a manner that it will retain its bloom and the occurrence of shrinkage and freezer burns will be avoided.

Other objects and advantages of the invention will be apparent from the specification.

The use of my process will be particularly described with reference to poultry, but its application to other fresh produce will be obvious to a person skilled in the art.

To apply the process to poultry, the fowl is killed and preferably drawn in the usual manner, although the latter step may be dispensed with. The carcass is sprayed with chlorine water (a solution of from ten to eighteen parts of chlorine to one million parts of water) to cleanse the carcass. If the carcass has been drawn, the interior will be cleaned by this operation and the carcass will be disinfected from chance contamination during dressing. The carcass is then placed in a chilling room and thoroughly chilled to a temperature of from 32° to 33° F.

After chilling, the carcasses are dipped into a colorless, tasteless, odorless bland mineral oil, such as paraffin or asphaltum base oils, or other suitable oil. In order to properly carry out my invention, the oil must be saturated with carbon dioxide, either by placing dry ice in the oil or by bubbling carbon dioxide gas therethrough in the usual manner. The oil must also have a pour point of from 33° to 45° F. The preferred pour point is between 35° to 37° F., I refer to a pour point of 33 to 45 degrees because this is slightly above the freezing point of water, which in general is the approximate storage temperature for the preservation of foodstuffs, such as meats, poultry or seafood. It will be appreciated that an oil of this pour point will be congealed (possibly at or approaching the point where the oil may be opalescent) to form a thin film upon the product when subjected to storage temperatures, and thereby form a non-liquid coating upon the same. This coating will remain in a non-liquid state during the entire storage period and, thereby, effectively protect the product. It is, of course, desirable that such coating be non-liquid during the storage period, but it is to be noted that with a pour point such as I have specified, the coating liquefies at higher temperatures than those employed for storage and may, thereby, be readily removed. It will also be appreciated that when the produce is stored at either a lower or higher temperature than specified above, namely, in the neighborhood of 32° F., the pour point of the oil may likewise be varied to slightly above the storage temperature. A third necessary characteristic of the oil is that it must have a viscosity of approximately 70° Saybolt units at 100° F.

The chilled carcasses are dipped into the oil, the oil being maintained at a temperature of from 5° to 10° F. above its pour point. The chilled carcass chills the oil and the oil is almost immediately congealed to a semi-liquid state. After the carcass has been dipped in the oil it is preferably wrapped in oiled or waxed airtight wrappers of the type described in the pending application for a Process of preparing and storing fresh produce, filed by Leander S. Stuart and myself May 14, 1931, Serial No. 537,494. The carcasses may, if desired, be wrapped in "Cellophane", and then stored in the usual manner. The wrapping of the carcass in the manner described above gives the best results, but good results have been obtained without the wrapping operation.

The carbon dioxide in the oil with which the carcass is coated, retards enzymatic activity of the skin of the carcass and reduces to a minimum the oxidative changes in the skin and flesh. The carbon dioxide saturated oil, in effect, forms an inert blanket or coating upon the carcass. Since the "pour point" of the oil is well above the freezing temperature of water, it results that the oil is in a semi-solid state before the localized areas of moisture which cool under the skin can freeze. Oil of the viscosity mentioned above will provide a thin yet completely protective coating upon the skin of the carcass.

I claim:

1. The process of preventing freezer burns on food stuffs comprising coating said food stuffs with an oil, said oil being substantially saturated with carbon dioxide.

2. The process of preventing freezer burns on food stuffs comprising coating said food stuffs with an oil, said oil being substantially saturated with carbon dioxide and having a pour point of 33–45° F.

3. The process of preventing freezer burns on food stuffs comprising coating said food stuffs with an oil, said oil being substantially saturated with carbon dioxide and having a pour point of 33–45° F. and a viscosity of about 70° Saybolt units at 100° F.

4. The process of preventing freezer burns on animal tissue comprising coating said animal tissue with an oil, said oil being substantially saturated with carbon dioxide.

5. The process of preventing freezer burns on animal tissue comprising coating said animal tissue with an oil, said oil being substantially saturated with carbon dioxide and having a pour point of 33–45° F.

6. The process of preventing freezer burns on animal tissue comprising coating said animal tissue with an oil, said oil being substantially saturated with carbon dioxide and having a pour point of 33–45° F. and a viscosity of about 70° Saybolt units at 100° F.

7. The process of preventing freezer burns on fowl comprising coating said fowl with an oil, said oil being substantially saturated with carbon dioxide.

8. The process of preventing freezer burns on fowl comprising coating said fowl with an oil, said oil being substantially saturated with carbon dioxide and having a pour point of 33–45° F.

9. The process of preventing freezer burns on fowl comprising coating said fowl with an oil, said oil being substantially saturated with carbon dioxide and having a pour point of 33–45° F.

10. The process of preserving poultry comprising cleansing the carcass of said poultry, chilling said carcass to 32–33° F., dipping said chilled carcass into an oil substantially saturated with carbon dioxide and maintained at temperatures of 5–10° F. to produce a congealed semi-solid protective coating on said carcass and subsequently sealing said coated carcass in an air-tight wrapper.

11. The process of treating foodstuff, comprising coating the surface of the foodstuff with an oil substantially saturated with carbon dioxide, said oil having a pour point in excess of the storage temperature to which the foodstuff is subjected, and subjecting said foodstuff to its storage temperature thereby congealing said oil.

THEODORE L. SWENSON.